DEVICE FOR THE STORAGE OF INFORMATION BY ELECTROCHEMICAL MEANS

Filed Sept. 22, 1966 2 Sheets-Sheet 1

INVENTOR.
STANLEY P. LEVY

DEVICE FOR THE STORAGE OF INFORMATION BY ELECTROCHEMICAL MEANS

Filed Sept. 22, 1966 2 Sheets-Sheet 2

INVENTOR.
STANLEY P. LEVY

United States Patent Office 3,466,617

Patented Sept. 9, 1969

3,466,617

DEVICE FOR THE STORAGE OF INFORMATION BY ELECTROCHEMICAL MEANS

Stanley P. Levy, 145 W. Cuthbert Blvd., Oaklyn, N.J. 08107

Filed Sept. 22, 1966, Ser. No. 581,381
Int. Cl. G11b 5/00
U.S. Cl. 340—173 10 Claims

ABSTRACT OF THE DISCLOSURE

A device for the storage of data information comprising an alkali halide crystal containing at least two conductor elements therein, said conductor elements leading from the exterior faces of said crystal to an interior portion at which they pass in close proximity, one of said conductors containing diffusible metal material which is the same element as the positive ion of said alkali halide crystal, means for applying a voltage potential across the aforesaid region between said conductors to cause migration of said metal material into said crystal to form an F center region between said conductors, means for sensing and eliminating said F center and means for placing information into said crystal, sensing and erasing it.

This invention relates to devices for the storage of information in data processing and more specifically to the storage of information by electrochemical means.

An object of this invention is to make a memory device for use in data processing equipment which is capable of high speed read in and read out of information.

Another object of this invention is to provide a memory device for use in data processing equipment which may be used for both long time and short time storage of information with equal facility.

It is a further object of this invention to provide a memory storage device for data processing equipment which will retain the information stored therein even in the event of a power failure.

It is a still further object of this invention to provide a data storage device for data processing equipment which is capable of a high volumetric density of information storage.

It is another object of this invention to provide a memory device in which the information is available for random retrieval. Any bit of information can be read without processing for remainder of the data in the memory.

This invention is based on certain physical phenomena which occur in ionic crystals through the interaction of the crystal material with electrical fields. The effect used is based on the so called F centers which are regions in the ionic crystals which have an excess of positive ions or a deficiency of negative ions. The regions in the crystals where this occurs are characterized by an intense coloration and electrical properties which are markedly different from the rest of the crystal. For example the dielectric constant of the F center regions is several times the value for the bulk of the crystal. Another characteristic of the F centers which is of importance in the present invention is that they can be caused to move under the influence of an electrostatic field. This effect is dependent on such factors as the field strength, field duration, temperature, and the specific characteristics of the crystal and these values are chosen for best effect. Further and extensive detail on F centers may be found in the book "Electronic Processes in Ionic Crystals" by Mott and Guerney, Oxford Press, London, England.

The basic element in the memory device of the present invention comprises two conductor elements with an ionic crystal material between them. A source of positive ions is introduced into the crystal adjacent to one of the conductor elements by placing a source of the metal comprising the positive ion in the crystal between the conductor elements and the crystal material. Information is introduced into the memory element by the application of an electric voltage to the conductor elements which appears as a field between the conductor elements. The field causes the migration of positive ions from the region where they have been adjacent to the conductor into the region between the conductor elements. This results in the formation of F centers in the region between the conductor elements and results in an increase in the capacitance of the circuit of the circuit comprising the conductor elements and the ionic crystal. This change in capacitance can be sensed by suitable devices hereinafter described and the memory element can be read. The application of an electrical voltage of the reverse polarity will cause the F centers to migrate back to the region adjacent the conductor where the source was placed and cause the crystal to revert to its original state so that the information bit can be erased from the memory element.

Figure 1:
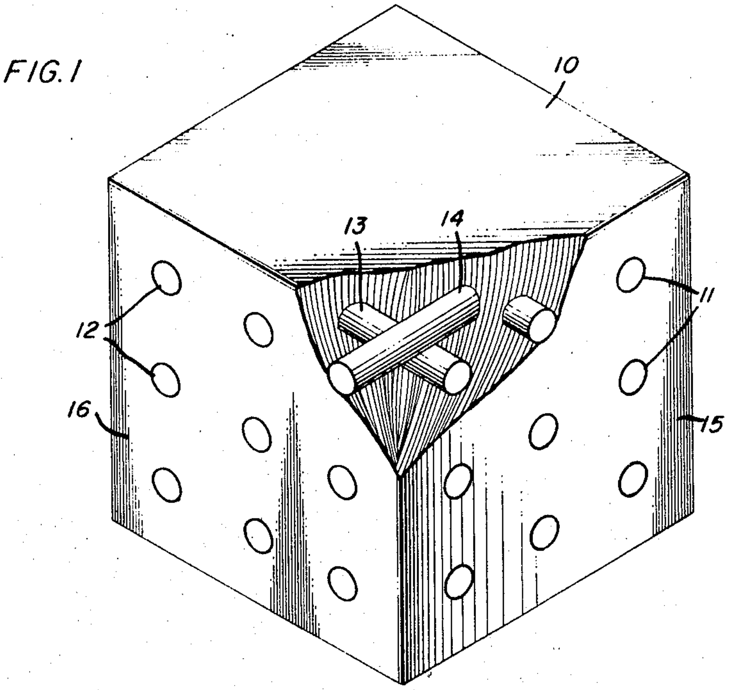
FIGURE 1 is a perspective view of an ionic crystal memory in accordance with the present invention.
Figure 2:
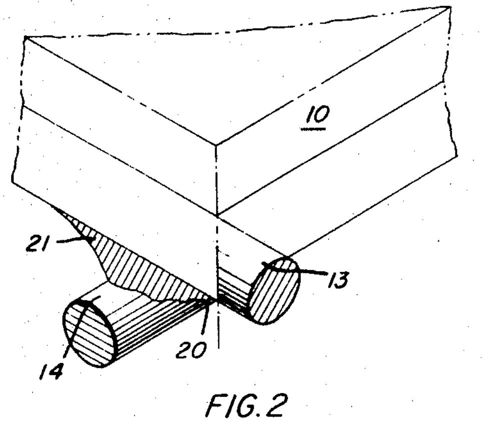
FIGURE 2 is an enlarged view of a memory intersection of FIGURE 1.
Figure 3:
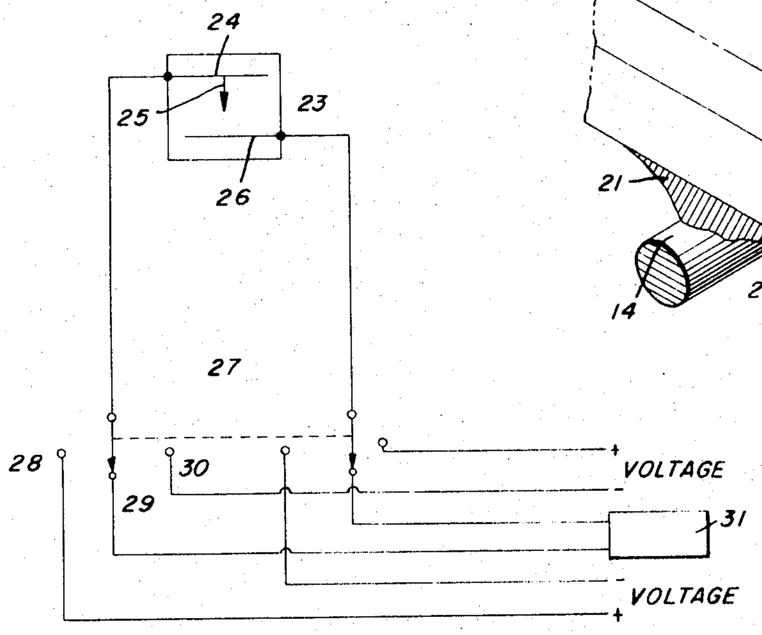
FIGURE 3 is a circuit diagram of the read, write, and erase operations of the memory.

A specific embodiment of the invention is shown in the drawings FIGURES 1, 2, and 3. In FIGURE 1 is shown a crystal of potassium chloride, an ionic crystal which has properties suitable for the operation of the invention, 10. In the faces of the crystal 15 and 16 are sets of mutually perpendicular holes 11 and 12 containing conductors 13 and 14 which pass completely through the crystal 10. The set of holes 11 containing conductors 13 are displaced in the direction indicated by the arrow 19 so that the conductors are skew to each other and do not intersect. The set of holes 12 in face 16 of the crystal 10 are filled with an amalgam of potassium and mercury to form the conductors 14. The set of holes 11 in the face 15 of the crystal 10 is filled with mercury to form the conductors 13. FIGURE 2 is an enlarged view showing two of the conductors 14 and 13 which are in faces 16 and 15 respectively of the crystal 10. The operation of the invention takes place in the region 20 between the conductors 14 and 13. When an electric field is applied to the two conductors 14 and 13 it causes the potassium metal in the conductor to migrate to the wall of the conductor 22 and thence into the potassium chloride crystal to form a region of F centers 21. This represents the storage of a single bit of information. At normal temperatures a field strength of 1,000 to 10,000 volts per centimeter will cause the F center movement at useful rates of speed. The upper limit will cause the fastest response but it is limited by the breakdown voltage of the crystal 10.

In order to indicate the storage capacity of the memory devices made according to the instant invention it is useful to indicate the dimension range of the elements of the memory device. The conductor diameter is limited on the low size only by the ability to produce small diameter holes and fill them with suitable conductor materials as indicated. Holes in the range of .002" to .005"

are made regularly and filled with amalgams from suitable capillary filling devices. The spacing between the conductors 14 and 13 can be of the same order of magnitude provided that suitable circuits are used which do not overstress the crystal electrically. The advantage of using as small a conductor size as possible and as small a spacing as possible is that the number of intersections, and hence storage points increases per unit volume. In addition since the rate of movement of the F center is dependent on the field strength is limited by the dielectric strength of the crystal, the smaller the spacing, the faster a bit of information can be written into the memory and the faster it can be removed by means of a field of reverse polarity.

The potassium mercury amalgam may contain from a few tenths of one percent of potassium to 10 percent potassium or more. The only limitations on the low end is that there be sufficient potassium to migrate to the surface of the conductor to form F centers and that there not be so much that the material is hazardous to handle.

The junction region which is the storage element is shown in symbol form in FIGURE 3 at 23. The conductors are shown as the lines 24 and 25 and the arrow 25 from 24 shows the direction of migration of the F centers when the element is activated. The read, write, and erase operations are shown by the circuit in FIGURE 3. When a suitable switching means such as the switch 27 is moved into the first position 28, a voltage is applied which will write a bit of information into the memory element 23. When the switch 27 is moved into position 29, the presence or absence of the F center region is sensed by the capacitance measuring device 31. This can be, for example, an oscillator whose change of frequency indicates the change in capacitance of the memory element 23. In position 30 the switch 27 applies a voltage of reverse polarity to the memory element 23 and the information is erased by the reverse migration of the F centers back into the conductor 24.

Figure 4:
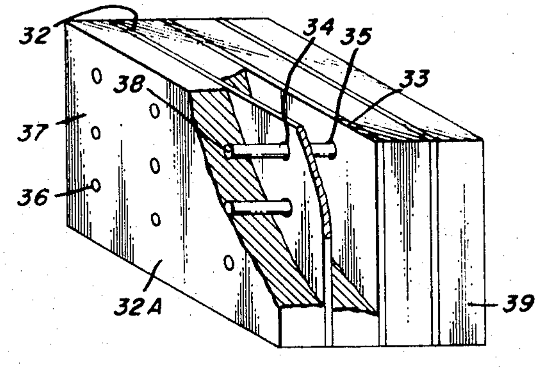
FIGURE 4 is an alternate construction of the memory of FIGURE 1.

An alternate construction system is shown in FIGURE 4. An ionic crystal of a type suitable for this invention 32A is grown around several perforated conductor plates 32, 33, the plates being so arranged that the holes 35, 34 are in alignment. The crystal 32A, comprising the ionic crystal material and the conductor plates 32, 33, has holes 36 made in it, the holes 36 being somewhat smaller than the holes 34, 35, perpendicular to the face 37, so arranged that the holes 36 pass through the holes 34, 35 in the conductor plates 32, 33 and entirely through the crystal 32A. The holes 36 are filled with an amalgam of potassium and mercury to form the conductors 38. Operation of this construction of the invention is similar to that of the construction shown in FIGURE 1, excepting that the F centers migrate radially from the center of the conductor 38 in the plane of the conductor plate 32.

The advantage of this type construction is that the number of switching operations required to connect to a given memory junction is reduced, since it is no longer possible to choose a conductor 32 in face 39 and a conductor 38 in face 37 that do not contain a memory junction.

Figure 5:
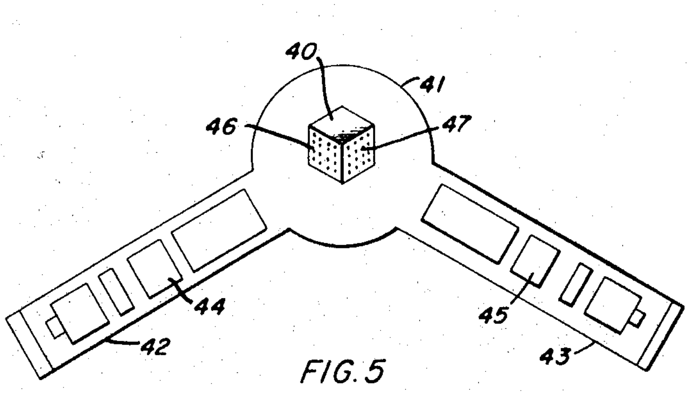
FIGURE 5 is an alternate read, write and erase system employing cathodes ray beams.

An alternate read and write system is shown in FIGURE 5. A crystal 40, having all necessary conductors hereinbefore described, is placed in an evacuated enclosure 41 having two necks 42, 43, the axes of which are mutually perpendicular. Two electron guns 44 and 45 are put into the two necks 42 and 43, the electron guns 44, 45 being of the type having an adjustable velocity beam capable of reading from a capacitive target, such as the type employed in vidicon tubes. The elements of this system, comprising the enclosure 41, the crystal 40, the two necks 42, 43, and the two electron guns 44, 45, are so arranged that the beam from the electron gun 44 in the neck 42 will strike and be used to index the face 47 of the crystal 40, and the beam from the electron gun 45 in the neck 43 will strike and will be used to index the face 47 of the crystal 40.

In operation, the beams from the electron guns 44, 45 are deflected to the appropriate conductors for the desired memory junction. Raising the cathode voltage of the electron gun used to index the face containing the conductor elements that are of the potassium and mercury amalgam will have the effect of impressing an electrostatic field across the memory junction, causing the F center to migrate, representing the bit of information. Reading is done by maintaining one electron beam on one conductor element to establish a reference and scanning the remaining beam past the other conductor element. The amplitude of the pulse output of the reading gun is proportionate to the capacity of the memory junction. Erase is accomplished by raising the cathode voltage of the electron gun used to index the face containing the mercury conductor elements. This applies an electrostatic field of opposite polarity across the memory junction, causing the F centers to migrate back to the conductor from which they came, erasing the information bit.

Figure 6:
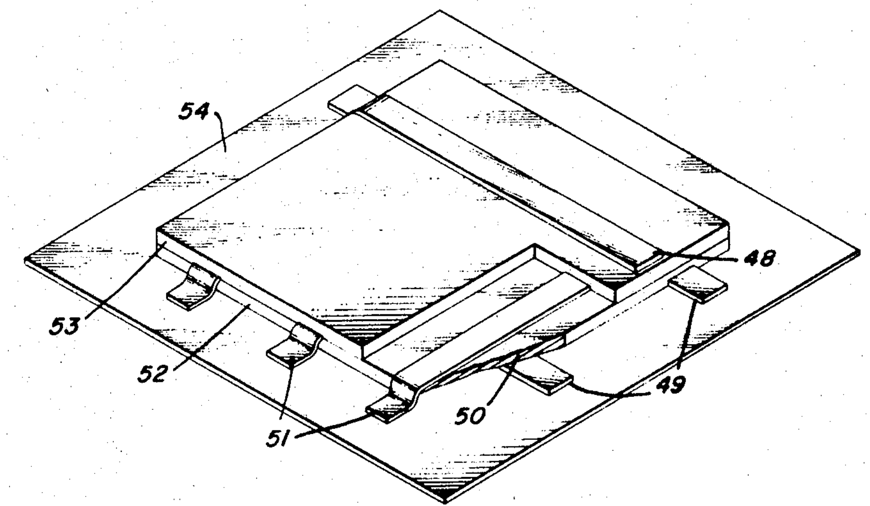
FIGURE 6 is a further alternate construction of the memory of FIGURE 1 employing vacuum evaporation manufacturing techniques.

An alternate construction system by means of vacuum evaporation is shown in FIGURE 6. In this figure, 54 is a substrate of inert nonconductive material. The pattern of gold or other inert metal conductors 49 is put on the substrate 54 by vacuum evaporation. Then a layer of potassium chloride 52 is put on the substrate 54 and conductors 49 by the same technique. Finally, a pattern of conductors 51 of potassium is deposited on the potassium chloride layer 52, so arranged that the conductors 49, 51 are at right angles and skewed. A memory junction is formed at the point of nearest approach of a conductor 49, a conductor 51, and the region of potassium chloride between 50. The process can be extended to any number of layers by adding other layers of conductors 48 and continuing the process. After completion, the device is placed in a dry, inert environment for protection. The operation of this device is electrically identical to that of the memory device shown in FIGURE 1. This technique leads to very small F center regions 50 and consequently high speed read and write operation. It is adaptable to the cathode ray tube system and retains all the advantages of the basic system.

While my invention has been described with respect to the specific embodiments shown in the drawings and described hereinbefore in the specification, it is not limited except as stated in the following claims.

I claim:

1. A device for the storage of data information comprising a crystal selected from the group consisting of alkali halide crystals and alkaline earth halide crystals, said crystal containing at least two conductor elements therein, said conductor elements leading from the exterior faces of said crystal to an interior portion at which they pass in close proximity, one of said conductors containing diffusible metal material which is the same element as the positive ion of said alkali halide crystal, means for applying a voltage potential across the aforesaid region between said conductors which will cause migration of said metal material into said crystal to form an F center region between said conductors, means for sensing the presence of said F center region, and means for applying a potential voltage in the opposite polarity to the aforesaid voltage potential to cause the migration of said metal ions back to said metal containing conductor with the consequent elimination of said F centers in said region between said conductors which comprises a means for placing information into said crystal, sensing the presence of said information, and erasing said information from said memory or data storage device.

2. A device as described in claim 1 wherein the means for sensing the presence of information is an electronically operated oscillator the frequency of which is changed by virtue of the difference in dielectric constant between the ionic crystal material with and without the presence of F centers.

3. A device as described in claim 1 wherein the crystal has a large array of conductors passing through the crystal from two of the faces so that each close passage of one of the conductors to the next represents a potential storage area and wherein the switching from one skew pair of conductors is done by means of switching devices such as reed switches.

4. A device as described in claim 1 wherein one set of conductors are sheets of material with apertures therein and the other set of conductors are wire like members which pass through said conductor sheet aperture whereby the number of switching operations is substantially reduced.

5. A device as described in claim 1 wherein the crystal is placed in a vacuum tube equipped with electron guns, said electron guns having suitable characteristics so that the beams may be focussed on pairs of conductors to write in information as described in claim 1, to sense the presence of the information at a cross-over point by pulse sensing techniques which will determine the change in capacitance of the crossover point with and without F centers, said combination of said crystal containing conductor elements comprising a high speed random access memory system.

6. A device as described in claim 1 wherein the crystal material is further selected from the group consisting of the chlorides, fluorides, bromides, and iodides of lithium, sodium, potassium, rubidium, caesium, calcium, strontium and barium and the metal introduced into the conductor would be the corresponding alkali or alkaline earth metal to the crystal chosen.

7. A device as described in claim 1 wherein the conductor elements are holes in the crystal filled with mercury containing the specific element indicated as an amalgam and wherein the other conductor can be either mercury or other conductive element.

8. A device as described in claim 6 wherein the crystal used is potassium chloride and the conductors are mercury and mercury potassium amalgam.

9. A device as described in claim 2 in which the sensing circuit is a difference oscillator which beats the frequency of the circuit containing no F centers at the intersection with that of an oscillator containing F centers at said intersection and the difference frequency is used to drive a circuit which will cause an indicator lamp to light.

10. A device as described in claim 6 wherein the conductor elements are holes in the crystal filled with mercury containing the specific element indicated as an amalgam and wherein the other conductor can be either mercury or other conductive element.

References Cited

UNITED STATES PATENTS

| | | | |
|---|---|---|---|
| 2,901,662 | 8/1959 | Nozick | 340—173 X |
| 3,123,748 | 3/1964 | Brownlow | 340—174 X |
| 3,196,743 | 7/1965 | Dreyer | 340—173 X |
| 3,259,888 | 7/1966 | Cornely et al. | 340—174 |
| 3,296,594 | 1/1967 | Van Heerden | 340—173 X |
| 3,341,826 | 9/1967 | Lee | 340—173 |

BERNARD KONICK, Primary Examiner

J. F. BREIMAYER, Assistant Examiner